(12) United States Patent
Campbell et al.

(10) Patent No.: US 6,474,104 B1
(45) Date of Patent: Nov. 5, 2002

(54) POLISHING GLASS

(75) Inventors: Brian Reginald Campbell, Ormskirk (GB); Steven Peter Makin, St Helens (GB)

(73) Assignee: Pilkington United Kingdom Limited, St. Helens (GB)

( * ) Notice: Subject to any disclaimer, the term of this patent is extended or adjusted under 35 U.S.C. 154(b) by 0 days.

(21) Appl. No.: 09/445,515

(22) PCT Filed: Jun. 10, 1998

(86) PCT No.: PCT/GB98/01696

§ 371 (c)(1),
(2), (4) Date: Feb. 4, 2000

(87) PCT Pub. No.: WO98/56725

PCT Pub. Date: Dec. 17, 1998

(30) Foreign Application Priority Data

Jun. 11, 1997 (GB) .............................................. 9712195
May 30, 1998 (GB) .............................................. 9811596

(51) Int. Cl.⁷ .............................................. C03C 17/00
(52) U.S. Cl. ........................................ 65/60.1; 65/60.5
(58) Field of Search .................................. 65/60.1, 60.5

(56) References Cited

U.S. PATENT DOCUMENTS 3,583,110 A * 6/1971 Scott
4,900,634 A * 2/1990 Terneu et al.
4,910,088 A   3/1990 Baudin et al.
5,234,769 A   8/1993 Shevlin

FOREIGN PATENT DOCUMENTS

| DE | 1912938 A | 9/1970 |
|---|---|---|
| DE | 1930615 A | 12/1970 |
| GB | 1240815 A | 7/1971 |
| GB | 2196349 A | 4/1988 |
| JP | 2047601 A | 2/1990 |

OTHER PUBLICATIONS

02–047601; Application No. 63–197131 filed Aug. 9, 1988 & JP 02.

* cited by examiner

Primary Examiner—Christopher A. Fiorilla
(74) Attorney, Agent, or Firm—Marshall & Melhorn, LLC

(57) ABSTRACT

A method of making coated glass including producing a continuous ribbon of glass, depositing a coating onto a surface of the ribbon during the production process and polishing the coated surface of the ribbon using at least one rotating polishing head. Preferably one or more of the rotating polishing heads have an axis of rotation substantially parallel to the plane of the ribbon. The invention also provides a method of treating glass including polishing a surface of the glass with at least one polishing head wherein the axis of rotation of the polishing head is substantially parallel to the plane of the glass, glass polished according to the methods of the invention and a flat glass production line including a polishing station including at least one rotating polishing head.

20 Claims, 3 Drawing Sheets

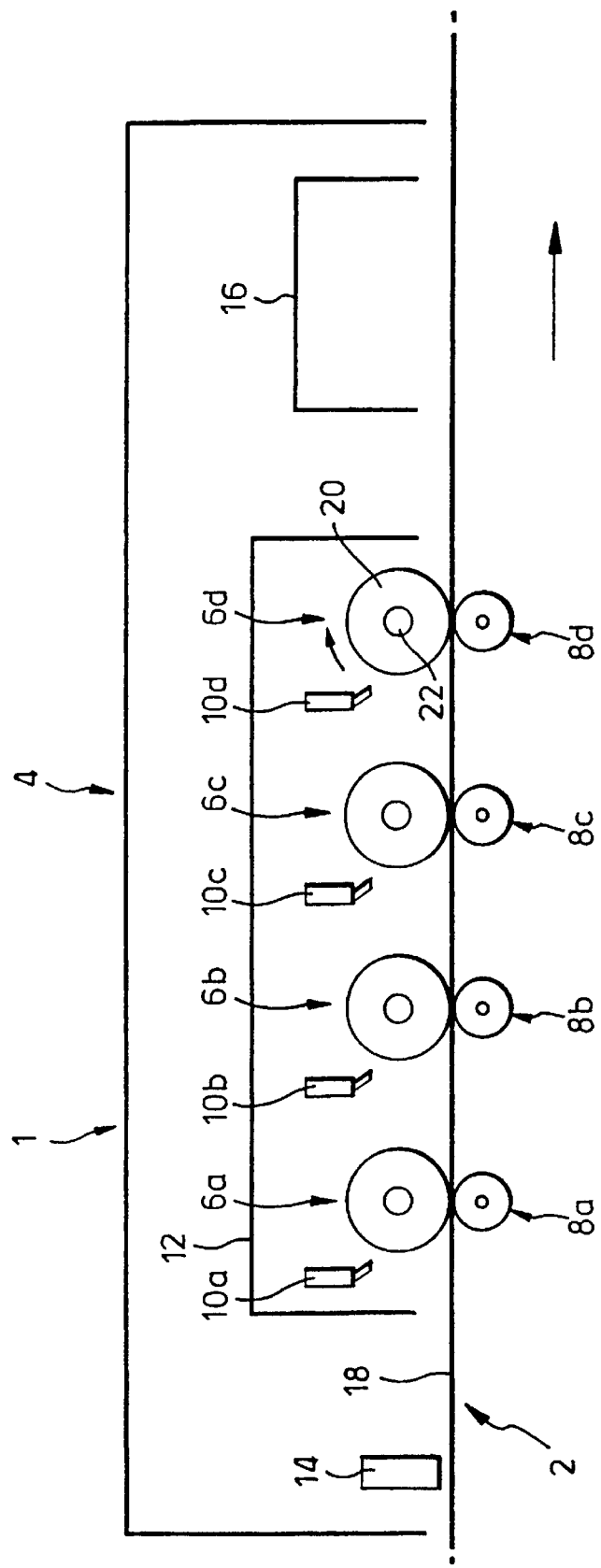

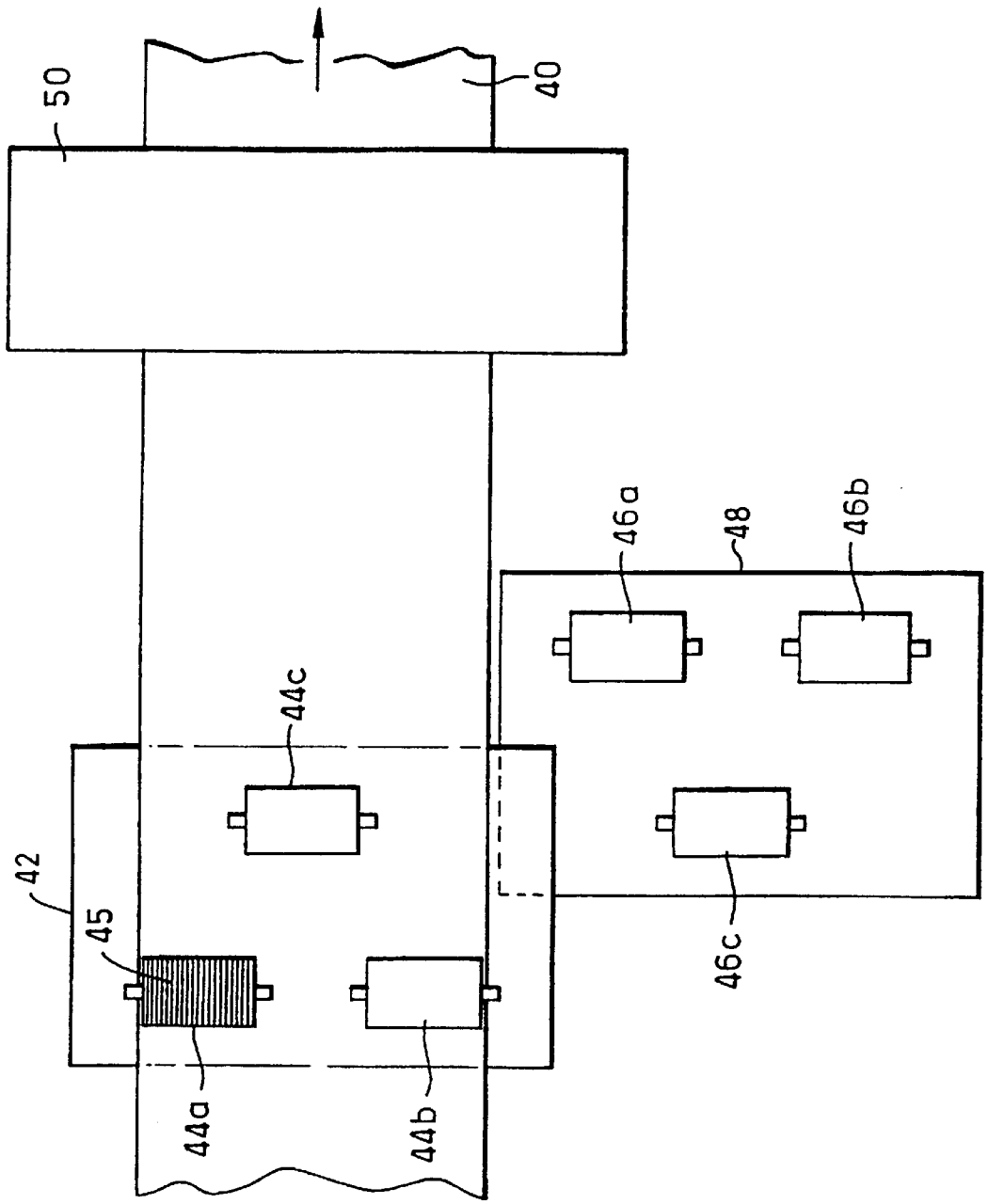

POLISHING GLASS

This application is a 371 of PCT/GB98/01696 filed Jun. 16, 1998.

BACKGROUND OF THE INVENTION

1. Field of the Invention

The invention relates to a method of treating glass suitable for incorporation in a glass production process and in particular to a method involving polishing especially coated glass. The invention also relates to polished coated glass and glazing incorporating such glass, and a float glass production line incorporating a polishing station.

Glass made by the float glass production process is commonly known as float glass. The float process involves forming molten glass into a continuous ribbon by floating the molten glass on molten tin and then conveying it through an annealing lehr at line speeds that may be 1000 m/hour or higher. For some time, coatings have been applied to float glass on-line, that is, during the glass forming, i.e. glass production, process. A coating may be deposited on to the ribbon pyrolytically, whilst it is still hot. This may be done in the molten tin bath, in the annealing lehr or between the two. Chemical vapour deposition is one pyrolytic technique which is known to be used in the on-line coating of glass.

An example of an on-line coated glass is the applicant's low emissivity (infra-red reflecting), fluorine doped tin oxide coated glass (hereinafter referred to as "PILKINGTON K GLASS" which is the applicant's trade mark for the glass). Low emissivity glass is commonly used in multiple pane insulating glazing units. The low emissivity coating reflects infra-red radiation, which would otherwise escape through the unit, back into the room.

PILKINGTON K GLASS™, because of its well regarded performance capability, is now widely used in multiple glazing. However, as part of a continual process of upgrading, the applicants have been addressing what further improvements may be made to the performance of the glass and specifically its haze and roughness characteristics.

An advantage of PILKINGTON K GLASS™, and other glasses with coatings applied pyrolytically on-line is that they are usually extremely hard. Coatings applied off-line, that is away from the float glass production line, say using separate DC magnetron sputtering apparatus, are commonly soft. Certain types of glazing, for example secondary glazing, have all their surfaces on occasion exposed and accessible. The hardness and hence durability of on-line coatings makes them ideally suited to use in such types of glazing. The less durable soft coatings, on the other hand, are limited to use in glazing applications in which they can be protected from exposure and accessibility and the consequent deterioration they may suffer. Thus, hard coatings tend to offer considerably more versatility than soft coatings in terms of glazing applications, although care is needed when handling, packing or cleaning glass with a hard coating so as not to leave marks upon it; because of their hardness, on-line coatings may abrade metal objects, such as wedding rings, and visible marks may be left upon them. Other instances when hard coatings are preferred to soft coatings are: double glazed roof lights which ideally have an infra red reflecting coating on the exterior-most surface so as to prevent icing and/or condensation formation; single glazed oven doors with an infra red reflecting coating on the inside surface so as to prevent heat escaping and to minimise the door surface temperature; insulating glazing units have been found to operate most effectively with low emissivity coatings on surfaces one and three (conventionally the pane surfaces of insulating glazing units are numbered one to four from the exterior-most surface to the interior-most surface).

Under particular, though not altogether common, lighting conditions, light scattering at the coating surface may cause certain on-line coated glasses to appear very slightly hazy. Slight haziness may be the result of any one or more of the roughness of the coating (which may be dictated by the deposition method, particularly the temperature employed) the coating precursors used and the coating thickness.

It is also known that the surface quality of uncoated glass, typically rolled wired glass, can be improved by grinding and polishing, but any polishing is done off-line with rotating polishing heads whose axes of rotation are perpendicular to the plane of the glass. Such perpendicular polishing arrangements tend to involve a considerable number of large and complex mechanisms which may be expensive, and successfully engineering such mechanisms into a float line would involve surmounting a number of problems. In particular, the formed glass ribbon is transported along a float line on spaced rollers whereas a perpendicular polishing arrangement traditionally requires the glass to be supported on a continuous flat bed. Also, the formed ribbon of float glass has selvedges which a perpendicular polishing arrangement could not easily accommodate.

2. Description of the Related Art

In United Kingdom patent application GB 2 196 349A a method of producing a vehicle window is disclosed which comprises depositing a coating on the surface of a glass sheet or ribbon, with the coating afterwards being polished using a battery of foam pads which apparently reciprocate over the glass surface; it is not clear whether the polishing treatment is carried out on-line or off-line. However, the description does not disclose how a fast polishing process which is capable of effectively polishing a glass ribbon at line speeds of, for example, 1000 m/hour or higher may be carried out, while ensuring that the glass ribbon is polished uniformly across its width, without visually noticeable areas of different polishing quality (although haze in unpolished PILKINGTON K GLASS™ and other hard coats is not usually readily apparent, adjacent areas of PILKINGTON K GLASS™ polished to different levels of roughness are much more apparent to the eye).

SUMMARY OF THE INVENTION

The invention provides a method of making coated glass comprising forming a continuous ribbon of glass, depositing a coating on to a surface of the ribbon during the production process and polishing the coated surface of the ribbon, using at least one rotating polishing head.

It has been found that on-line coated glass which is also polished on-line in accordance with the invention has significantly improved haze characteristics and improved resistance to marking. Resistance to marking is of particular benefit in glazing applications where the position of the glass will mean that the coating is on an exposed surface. On-line polishing of coated glass also has a large cost advantage over off-line polishing which would require the additional expense of at least handling and transporting the glass from the float line to a suitable polishing rig. In addition, on-line polishing may reduce the so-called microcorrugations present in the surface of some of the thinner float glass which is coated for use, generally, in electronics applications. On-line polishing is also useful in the production of thicker-than-normal coatings (in the sense of thicker than would most commonly be used for glazing applications): a thicker-than-normal coating with improved emissivity is initially deposited and then polished so as to reduce haze.

Preferably, the coated surface is polished with one or more rotating polishing heads having an axis of rotation substantially parallel to the plane of the glass. Further preferably, the axis of rotation of the or each head is substantially parallel to the transverse axis of the ribbon. Adjacent heads may rotate either in the same or an opposite direction. The or each head may extend partially across the width of the ribbon, with one or more heads extending across one or both selvedges of the ribbon; the heads may be staggered so that in combination a plurality of part-width heads cover the full width of the ribbon; the heads may reciprocate along the transverse axis of the ribbon and may comprise a plurality of mops, preferably disc-shaped, mounted on a mandrel. The mops may be of cotton or of any other similar or suitable material especially soft materials. Disc-shaped mops are preferably up to 750 mm in diameter. Polishing medium may be applied to the or each head at the interface(s) between coating surface and polishing head, for example, by forming a pool of polishing medium on the coated surface. Alternatively, the mops may be impregnated with a polishing medium. The polishing medium may be alumina- or silica-based (although use of a silica based polishing medium is not preferred for polishing tin oxide coated glass as it is believed to increase the risk of scratching), pumice, tin oxide or any other equivalent or similar medium suitable for the purpose.

The glass may be supported underneath by rollers, which may be driven so as not unduly to stress the ribbon, or by any other support means which is capable of supporting the glass in such a way that the polishing is achieved evenly and without excessively distorting the formed ribbon.

The coating may be any material capable of changing or enhancing the properties of the glass in some way, but the invention is especially useful for polishing coating surfaces comprising metal oxide, preferably semiconducting metal oxide, such as fluorine, antimony or indium doped tin oxide.

While the invention has been developed primarily for the on-line treatment of coated glass, it has been found that the use of one or more polishing heads rotating about an axis parallel to the plane of the glass surface offers important advantages over prior art methods for polishing glass (whether coated or otherwise) off-line using polishing heads rotating about vertical axes. A surprisingly high polishing rate may be achieved, with a low residence time of the glass under the polishing head (enabling, for on-line polishing, the polishing station to be accommodated in a much smaller space on the line than anticipated if using a conventional off-line glass polishing procedure with polishing heads rotating about vertical areas). Moreover, it is easier to achieve uniform polishing across the width of the glass surface to be polished, the equipment is cheaper, and not so critical that the glass be maintained exactly horizontal to achieve uniform polishing.

Thus the invention also provides a method of treating glass comprising polishing the glass with at least one rotating polishing head, wherein the axis of rotation of the polishing head is substantially parallel to the plane of the glass.

Not only is the use of a rotating polishing head with an axis of rotation parallel to the plane of the glass advantageous for off-line polishing, as well as on-line polishing of coated glass, it is also useful for on-line polishing of uncoated glass, for example, to remove attached debris or inclusions (known as "top speck") from the surface of the glass prior to applying a coating.

Whether polishing a coated or uncoated surface, polishing medium may, as noted above, be applied directly to the polishing head(s), or to the interface(s) between the surface being polished and the polishing head(s).

In the former case, it is usually necessary to apply polishing medium to the head with a high pressure system so that the polishing medium is forced deep into the soft mops that comprise the polishing head to limit the extent to which polishing medium on the surface of the rapidly rotating polishing head is thrown off by centrifugal force during the polishing process. To prevent blocking of the spray apparatus, the polishing medium will usually contain grease or other lubricating agent, which, if it collects on the glass, may then need cleaning off.

In the latter case, polishing medium may be applied at the interface of the surface being polished and the head by a low pressure spray or through a pipe, and in neither method of application will grease normally be required in the polishing medium.

In either case, it is usually preferred for the polishing medium to comprise an abrasive, as discussed above, in suspension in a liquid, normally water. The water is believed to lubricate the polishing, reducing the incidence of scratching and formation of dust.

Preferably, the polishing head is dressed at intervals to ensure uniformity. This is important because uniformity of the polishing head improves uniformity of the polished ribbon. Dressing may comprise rotating the polishing head against a rule, including saw or straight edged blades.

A scratch detection device is, preferably, positioned down-ribbon of the rotating polishing head to reduce the likelihood of large areas of glass being damaged by scratching.

BRIEF DESCRIPTION OF THE DRAWINGS

The invention will now be described, by way of example, with reference to the following drawings in which:

FIG. 2 is a schematic illustration of a polishing station on a float glass production line, suitable for use in a method according to the invention.

FIG. 3 is a schematic illustration of an alternative polishing station on a float glass production line suitable for use in a method according to the invention.

DESCRIPTION OF THE PREFERRED EMBODIMENTS

Figure 1:
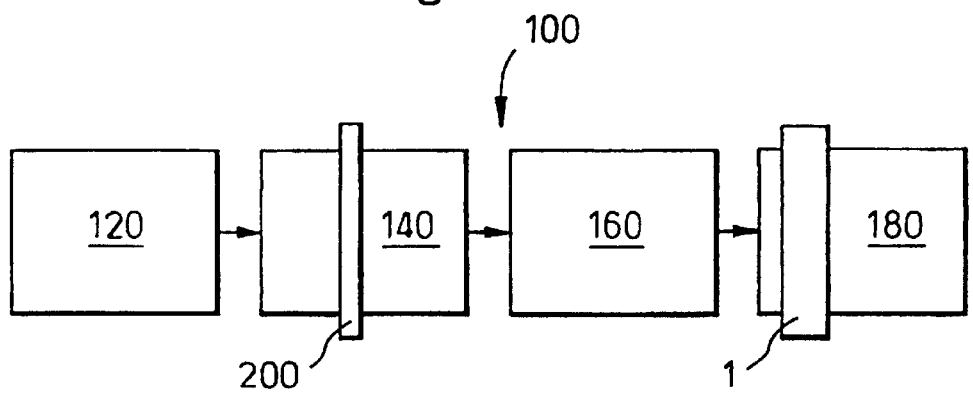
FIG. 1 is a schematic illustration of a float glass production line, including a polishing station, for making glass by a method according to the invention.

FIG. 1 illustrates schematically, a float glass production line comprising a glass melting section 120, a float bath section 140 for forming the molten glass into a continuous ribbon, a lehr section 160 for annealing the glass ribbon and a warehouse section 180 for cutting stock size sheets of glass from the ribbon for storage and/or distribution and use.

Located in the production line is a coating station 200 at which a coating of fluorine doped tin oxide is deposited on to the ribbon. In the illustrative embodiment, the coating station 200 is located in the float bath section 140. Located in the warehouse section 180 is a polishing station 1 at which the coated surface of the ribbon is polished.

With reference also to FIG. 2, a continuous ribbon of float glass is conveyed from left to right as viewed in the figure through a polishing station 1 comprising a housing 4, four polishing heads 6a–d and four associated reaction rollers 8a–d, four polish applicators 10a–d (one for each polishing head 8a–d) and pre- and post-polishing cleaning stations 14, 16.

Each polishing head 6 is generally cylindrical and comprises in excess of two hundred disc-like cotton mops 20 mounted side by side on a mandrel 22 (see head 6d). The mops 20 are of the type available in the UK from Roditor under the designation MA Article 1002 Light Ventilation PV. Each head 6 is 500 mm in diameter and 1200–1500 mm wide, thereby extending partially across the full width of the ribbon 2, including the selvedges of the ribbon. At any one time, three of the heads 6 are in operation and the fourth serves as an installed spare. In the illustrated embodiment, all four heads 6 are shown in-line, but it is feasible to have the spare in waiting alongside the line.

Polishing occurs at the area of contact (the mops 20 being deformable) made between each of the heads 6 and the coated upper surface of the ribbon 2. Each of the reaction rollers 8 opposes the pressure applied by its associated head 6 so as to prevent deformation of the ribbon 2. In order to prevent excess stresses being applied to the ribbon 2, the reaction rollers 8 are driven so that their peripheral speed matches that of the ribbon 2. Each head 6 is driven to rotate about its cylindrical axis and arranged such that the axis of rotation is substantially parallel to the transverse axis of the ribbon 2. Each head 6 either rotates in the opposite direction to its neighbours so that adjacent heads 6 are contra-rotating or in the same direction so that adjacent heads 6 are co-rotating. The duration of the contact between the heads 6 and the coated surface is about 0.4 seconds, which corresponds to a contact area length of 100 mm with the ribbon moving at about 800 mh$^{-1}$. The peripheral speed of each head is approximately 20–40 ms$^{-1}$.

Each of the applicators 10 is a high pressure spray, and polishing medium, of the type available in the UK from Canning-Lippert Ltd. under the designation 2350STA, is applied to each of the heads 6 as they rotate. Each of the sprays 10 applies a short pulse of polishing medium every 15 seconds.

The pre- and post polishing cleaning stations 14, 16 remove unwanted particulates and polish from the ribbon 2 respectively. Each station 14, 16 has a high efficiency air knife (not shown).

The table below lists the comparative properties of eight samples (1–8) of unpolished (Roughness~8.7 nm) and polished coated glass, wherein the coating comprises an outer layer of fluorine doped tin oxide as used in PILKINGTON K GLASS™.

The differences between the unpolished and polished values shown correspond to changes in haze and roughness of an order which users would perceive as a marked improvement; at these values, a distinct difference in both haze and susceptibility to marking would be visible to the user.

FIG. 3 illustrates schematically a polishing station on a float glass production line wherein the continuously produced ribbon of float glass 40, approximately 3.6 m in width, is conveyed from left to right, as viewed in the figure, through a polishing station 42 comprising three staggered polishing heads 44a–c. Each polishing head comprises a plurality of mops 45 arranged side-by-side along the axis of the head. For clarity the plurality of mops 45 are only shown for one polishing head, 44a. Three spare polishing heads 46a–c are situated off the glass ribbon in redundancy polishing station 48. Each polishing head 46a–c may be independently conveyed over the glass ribbon and put into operation in the event of the failure of one or more of the polishing heads 44a–c. Each polishing head 44a–c is approximately 1.2 m in width and has associated with it a reaction roller (not shown) supporting the glass ribbon, and a polish applicator (not shown) to direct polishing medium at about 90 litres/hour on to the glass ribbon just before the polishing head. Each polishing head rotates so that its peripheral speed is approximately 36 m/s and reciprocates across the ribbon so that the area of the ribbon polished by each head overlaps with at least one other area polished by a second polishing head. Typically the heads reciprocate at 80 cycles/min with an amplitude of ±20 mm.

Figure 4:
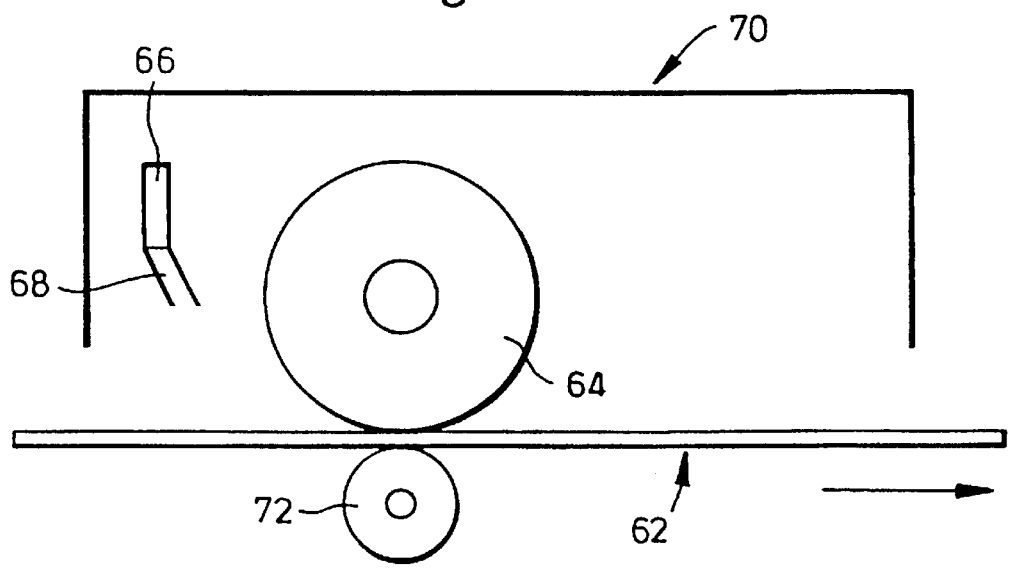
FIG. 4 is a schematic illustration of a single polishing head, suitable for use in a method according to the invention and as used to polish coated glass as described in the Examples.

FIG. 4 illustrates a polishing head of the kind schematically illustrated in FIG. 3 and also of the kind used to produce polishing coated glass as described in the following Examples.

A continuously produced float glass ribbon 62 moving from left to right in the figure is conveyed through a polishing station comprising a rotating polishing head 64, a polishing medium feed pipe 66 connected to a polish applicator 68 and a housing 70. The polishing head has an associated reaction roller 72. The polishing medium feed pipe 66 may contain polish medium under pressure if the polish applicator is constricted.

The invention is further illustrated by the following Examples 1–4, in which a glass ribbon was produced continuously by the float glass production process at a line speed of 560–1000 m/hr, coated by atmospheric pressure chemical vapour deposition during the production process with a coating comprising an underlayer of silicon oxide containing carbon about 65 nm thick and a layer of fluorine doped tin oxide between 320 nm and 360 nm thick, and a part of the coated ribbon width polished by a single polishing head of width 500 mm i.e. dimension along its axis of rotation generally as illustrated in FIG. 4 of the drawings.

Upstream on one polishing station the ribbon was cleaned by an air knife and the temperature of the glass ribbon at the polishing station was in the range 60–70° C. The polishing process caused an increase in the temperature of the ribbon of below 15° C.

|  |  | 1 | 2 | 3 | 4 | 5 | 6 | 7 | 8 |
|---|---|---|---|---|---|---|---|---|---|
| Haze (%) | Unpolished | 0.53 | 0.41 | 0.34 | 0.42 | 0.38 | 0.34 | 0.43 | 0.36 |
|  | Polished | 0.16 | 0.17 | 0.21 | 0.15 | 0.16 | 0.18 | 0.18 | 0.18 |
| Roughness Ra (nm) | Polished | 3.4 | 4.2 | 3.3 | 3.4 | 3.7 | 4.6 | 3.5 | 5.5 |

The polishing head comprised a plurality of annular mops mounted on a mandrel. Each individual mop was made of cotton (manufacturer—Roditor) and the grade was MA 1002 light ventilation PV. The diameter of each mop was 500 mm, sufficient mops being mounted for the polishing head to have a width of 400 mm or 500 mm. During polishing the polishing head exerted a force on the glass ribbon of 48 to 57 kg force (i.e. approximately 90 to 120 kg per metre width of head) measured by a standard load cell. The exerted force could be adjusted by a manually rotatable wheel connected to a threaded spindle pressing down on the mounting of the polishing head.

When polishing, the head rotated so that its peripheral speed was approximately 36 m/s and reciprocated across the width of the ribbon with an amplitude of ±20 mm at a frequency of 48 or 80 cycles/minute.

Liquid polishing medium comprising alumina abrasive in water (in Examples 1 and 2 with viscosity increasing components added to produce a paste-like consistency) was applied either to the polishing head or directly on to the glass ribbon at flow rates of 0.4 to 28 litres per hour. The concentration of abrasive (particle size approximately 20 $\mu$m) was either 35 or 2.4 wt %. In Examples 1 and 2 the medium was conveyed in a pressure line and sprayed through a nozzle. Occasionally the abrasive packed out and blocked the spray nozzle. In Examples 3 and 4 the medium was applied from a vessel through an unconstricted pipe and applicator with flow control being achieved using a peristaltic pump, with the abrasive being kept in suspension by bubbling air into the vessel containing the medium. It was noticed that for a peristaltic tube internal diameter of greater than 9 mm the abrasive came out of dispersion in the tube, consequently the medium was conveyed through a tube of 7 mm or less internal diameter.

To ensure its uniformity the polishing head was dressed at intervals by mounting the head on a lathe and rotating it against a rule (straight or saw-toothed blade). Dressing appeared to be particularly important when the polishing medium was applied directly on to the glass ribbon.

Processing details for each Example are described in Table 1.

Properties of the coated glasses before and after the polishing treatment are described in Table 2. In Table 2 $R_a$ is a measure of the roughness of a surface well known to those skilled in the art.

TABLE 1

|  | Example 1 | Example 2 | Example 3 | Example 4 |
| --- | --- | --- | --- | --- |
| Line Speed (m/hr) | 840 | 1000 | 560 | 840 |
| Glass thickness (mm) | 4 | 3 | 6 | 4 |
| Force exerted by head on glass (kg) | 51 | 57 | 48 | 45 |
| Width of polishing head (mm) | 500 | 500 | 400 | 500 |
| Peripheral Rotation of head | against ribbon movement | with ribbon movement | with ribbon movement | with ribbon movement |
| Peripheral Speed (m/s) | 36 | 36 | 36 | 36 |
| Reciprocation of head (cycles/min.) | 48 | 48 | 48 | 80 |
| Position of polishing head across ribbon | 2400 mm from edge of ribbon | 2400 mm from edge of ribbon | centre | centre |
| Flow rate of polishing medium (liters/hour) | 6.4 | 0.4 | 28 | 28 |
| Concentration of abrasive in polishing medium (wt %) | 35 | 35 | 2.4 | 2.4 |
| Polish deposited on to head or ribbon? | bead | head | ribbon | ribbon |

TABLE 2

|  | Example 1 | Example 2 | Example 3 | Example 4 |
| --- | --- | --- | --- | --- |
| Thickness of tin oxide layer after (before) polishing (nm) | 300 (320) | 302 (322) | 320 (340) | 340 (360) |
| Emissivity after (before) polishing | 0.155 (0.143) | 0.165 (0.16) | — | 0.17 (0.146) |
| Haze after (before) polishing (%) | 0.15 (0.3) | 0.08 (0.18) | — | 0.14 (0.32) |
| Colour coordinates after (before) polishing | a* −1.46 (−1.57) b* −3.27 (−2.56) | — | — | a* −2.01 (−3.1) b* 0.29 (2.6) |
| Visible reflectivity after (before) polishing | — | — | 12.5 (10.5) | — |
| $R_a$ after (before) polishing (nm) | 2.5 (8.0) | 3.48 (11.3) | — | — |

In each case, the haze was significantly reduced.

In all the specific embodiments described, a coated glass surface is polished using one or more polishing heads rotating around an axis substantially parallel to the plane of the glass, and transverse the direction of glass (ribbon) advance.

What is claimed is:

1. A method of making coated glass comprising:

producing a continuous ribbon of flat glass, the ribbon having at least one major surface;

depositing a coating onto the major surface of the ribbon;

providing a plurality of rotatable polishing heads, each such polishing head extending only partially across the ribbon, the plurality of polishing heads being arranged in a staggered formation;

causing the polishing heads to rotate;

causing the polishing heads to reciprocate along the transverse axis of the ribbon; and polishing the coated surface of the ribbon with the rotating, reciprocating polishing heads.

2. A method according to claim 1 wherein the coated surface is polished with one or more rotating polishing heads having an axis of rotation substantially parallel to the plane of the ribbon.

3. A method according to claim 2 wherein the axis of rotation of the or each said head is substantially parallel to the transverse axis of the ribbon.

4. A method according to claim 2 wherein the or each said head extends across one or both selvedges of the ribbon.

5. A method according to claim 4 wherein at least one head extends across both selvedges of the ribbon.

6. A method according to claim 1 wherein the, or each, said head comprises a plurality of mops mounted on a mandrel.

7. A method according to claim 6 wherein the mops are up to 750 mm in diameter.

8. A method according to claim 1 wherein polishing medium is applied to the coated surface of the ribbon with a polish applicator.

9. A method according to claim 1 wherein liquid polishing medium forms a pool on the coated surface of the glass ribbon.

10. A method according to claim 1 wherein polishing medium is applied to the, or each, head with a polish applicator or the, or each, head is impregnated with polishing medium.

11. A method according to claim 1 wherein a liquid polishing medium comprising a slurry of an abrasive powder dispersed in a liquid is used.

12. A method according to claim 1 wherein the polishing medium comprises alumina, silica, pumice or tin oxide.

13. A method according to claim 1 wherein the glass is supported during polishing by rollers or by some other form of support means.

14. A method according to claim 1 wherein the polishing head is dressed at intervals to ensure uniformity.

15. A method according to claim 1 wherein the or each said polishing head exerts a force on the glass ribbon in the range 90 to 120 kg force per meter width of polishing head.

16. A method according to claim 1 wherein a scratch detection device is positioned down-ribbon of the polishing head.

17. A method according to claim 1 wherein the glass ribbon is cut into sheets after polishing.

18. A method according to claim 1 wherein the coating is of metal oxide.

19. A method according to claim 18 wherein the coating is of semiconducting metal oxide.

20. A method according to claim 19 wherein the coating is of doped tin oxide.

* * * * *